UNITED STATES PATENT OFFICE.

OTTO N. WITT, OF WESTEND, NEAR BERLIN, ASSIGNOR TO THE BADISCHE ANILIN AND SODA FABRIK, OF MANNHEIM, GERMANY.

PURPLE AZO DYE-STUFF.

SPECIFICATION forming part of Letters Patent No. 381,046, dated April 10, 1888.

Application filed January 28, 1888. Serial No. 262,267. (Specimens.)

*To all whom it may concern:*

Be it known that I, OTTO N. WITT, doctor of philosophy, a citizen of Switzerland, residing at Westend, near Berlin, in the Kingdom of Prussia and Empire of Germany, have invented new and useful Improvements in the Manufacture of a Purple Coloring-Matter or Dye-Stuff, of which the following is a specification.

This invention relates to the manufacture of a purple coloring-matter or dye-stuff of the class commonly known as "azo" dye stuffs.

To carry out my invention I proceed as follows: I take 18.5 parts, by weight, of binitro-aniline of the modification known to chemists as the "assymmetrical" one, discovered by Gottlieb and melting at 180° centigrade. I then transform the said binitro-aniline into its diazo derivative by using any or either of the well-known methods for the purpose. As an example, I describe the following method, without, however, limiting myself to its exclusive use: I introduce the before-named quantity of binitro-aniline into one hundred parts, by weight, of ordinary concentrated or rectified sulphuric acid, in which previously 6.9 parts, by weight, of sodic nitrite, or 3.8 parts, by weight, of nitrous anhydride have been dissolved. When all the binitro-aniline has been taken up and dissolved by the acid, I pour the solution thus obtained upon chopped ice, and in this manner I prepare an aqueous solution of binitro-diazo-benzine sulphate. On the other hand, I dissolve 34.8 parts, by weight, of beta-naphthylamine disulphonate of sodium, such as may be obtained by heating beta-naphthol disulphonic acid, of the modification commonly designated by the letter "R," with caustic ammonia under pressure, together with one hundred and sixty-five parts, by weight, of sodic acetate (taken as dry) in about one thousand parts of water. This solution I mix in the cold, and under constant vigorous stirring, with the solution of binitro-diazo-benzine sulphate, obtained as above described.

The dye-stuff is formed at once, but remains in the solution, from which it may be separated by the addition of salt-water or dry common salt.

This new dye stuff dyes either wool or silk from an acid-bath in deep purple shades. In its dry state it forms a jet-black powder, which is easily soluble even in cold water. The addition of a large excess of alkali precipitates this solution, while small quantities of alkali may be added without any apparent change. The addition of concentrated acids changes the tint of the solution into a deep red or crimson, and the same color is exhibited by the solution of the dye-stuff in concentrated sulphuric acid.

What I claim as new, and desire to secure by Letters Patent, is—

The purple azo dye-stuff hereinbefore described, which forms in its dry state a jet-black powder and is easily soluble in cold water, forming a solution which is precipitated by the addition of a large excess of alkali, while small quantities of alkali may be added without any apparent change.

In testimony whereof I have hereunto set my hand in the presence of two subscribing witnesses.

OTTO N. WITT.

Witnesses:
 ERNST HEIM,
 B. ROI.